INVENTOR.
ROLAND F. BAGGS
MAX A. KECK, JR.
JAMES R. ROWE

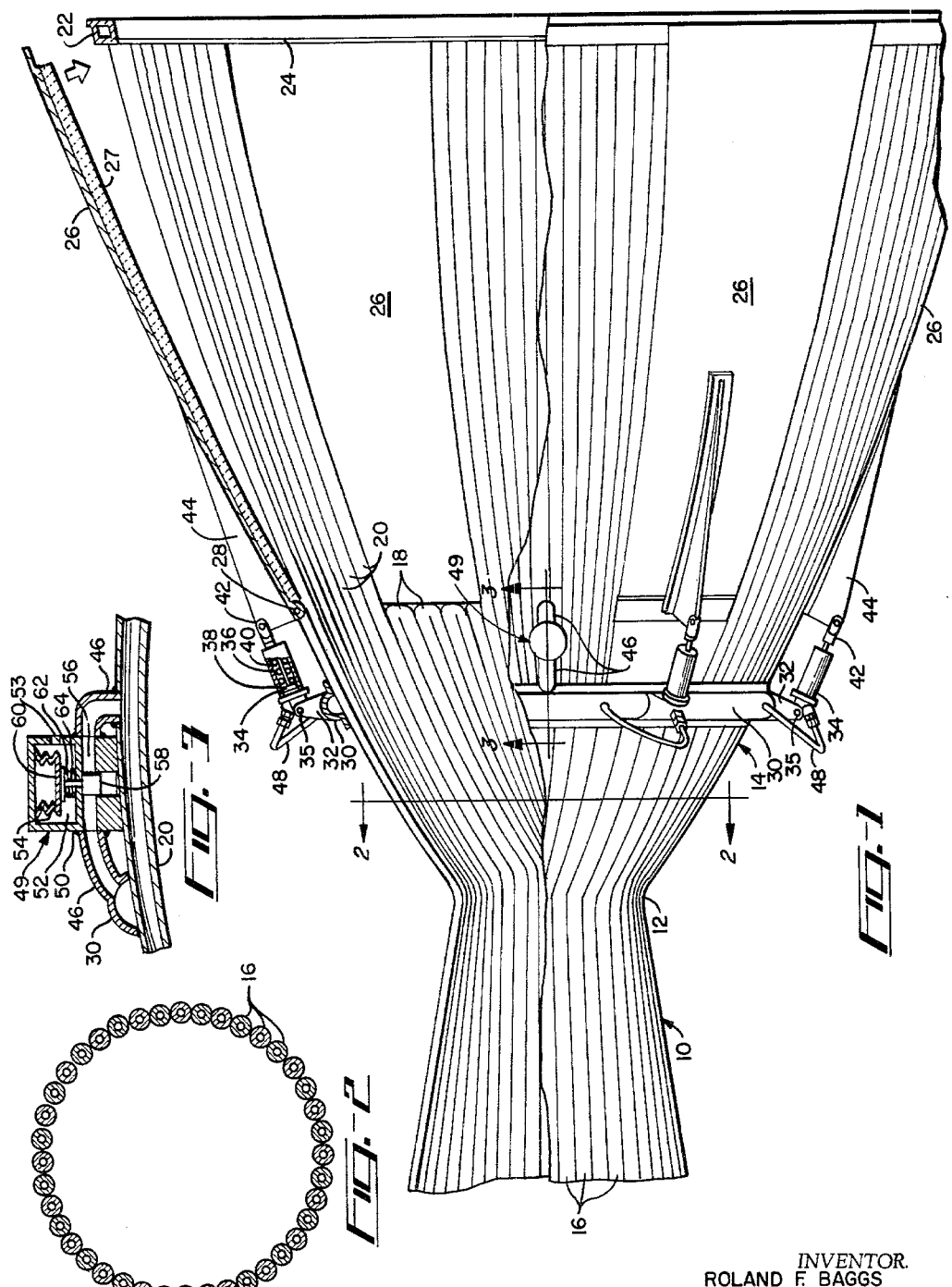

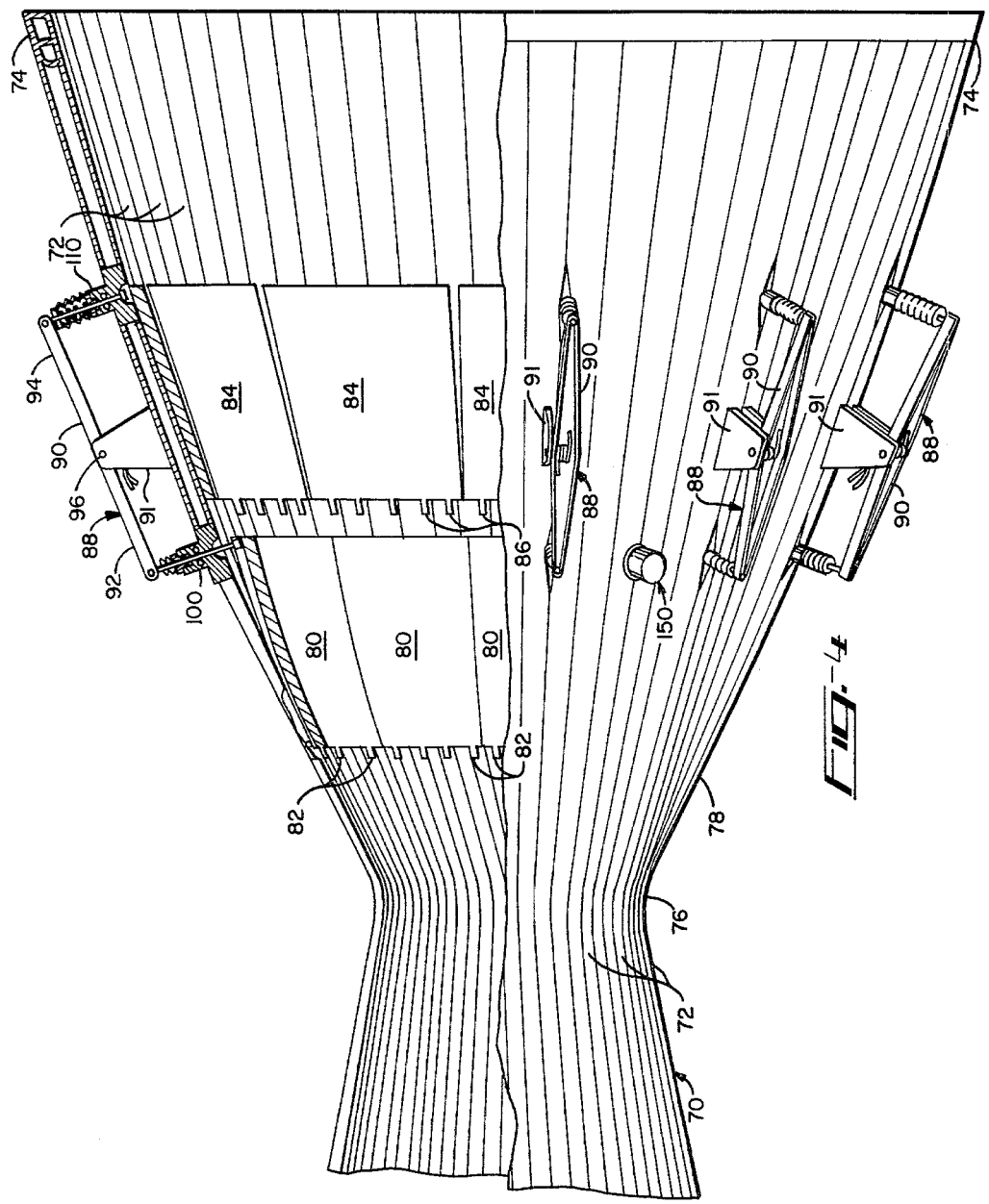

BY

ATTORNEY

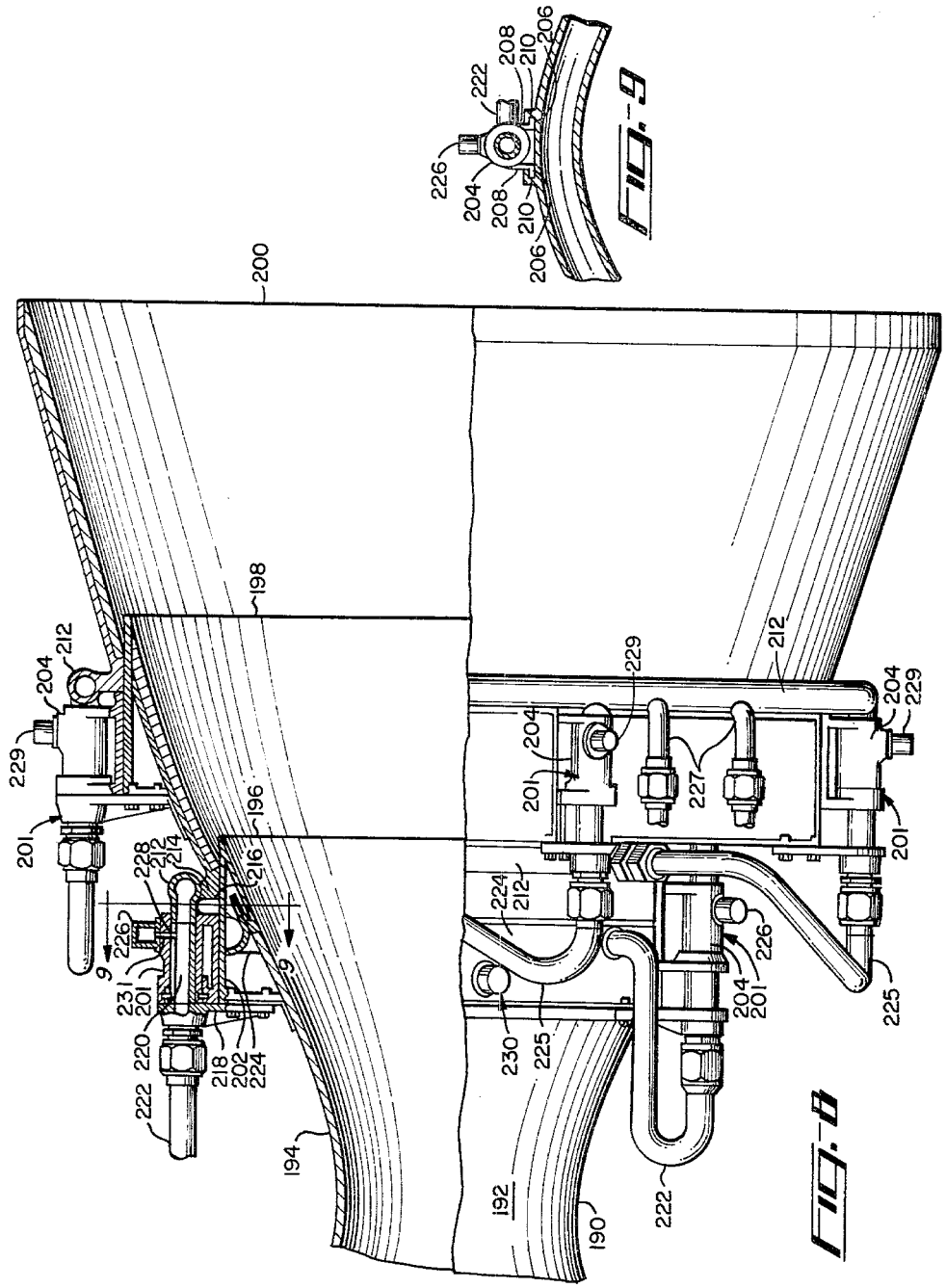

United States Patent Office 3,229,457
Patented Jan. 18, 1966

3,229,457
VARIABLE AREA RATIO ROCKET NOZZLE
James R. Rowe, Bethesda, Md., and Roland F. Baggs, Whittier, and Max A. Keck, Jr., West Covina, Calif., assignors, by mesne assignments, to the United States of America as represented by the United States Atomic Energy Commission
Filed Oct. 15, 1962, Ser. No. 232,328
2 Claims. (Cl. 60—35.5)

This invention relates to a liquid or solid rocket engine nozzle and in particular to a nozzle which changes shape during the ascent of a rocket to some high altitude.

Explanatory of the present invention, during ascent of a rocket to some high altitude, the decreasing atmospheric pressure sensed by the rocket engine nozzle requires a continuously increasing nozzle expansion area ratio to obtain optimum performance throughout this ascent, the increasing nozzle expansion area ratio being defined as the area of the nozzle discharge orifice divided by the area of the thrust chamber throat. Since a nozzle of one specific contour provides only a fixed expansion ratio, the performance of a rocket engine having such a nozzle falls short of the optimum performance of the rocket during flight at high altitudes.

It is therefore the general object of this invention to provide an adjustable nozzle for the thrust chamber of a rocket engine which nozzle has an increasing expansion area ratio during ascent of the rocket to some high altitude where the atmospheric pressure decreases.

Another object of the invention is to provide an adjustable nozzle which employs means responsive to atmospheric pressure to increase the nozzle expansion area ration to obtain optimum performance of the rocket throughout its ascent.

In its broadest aspect, the present invention comprises a diverging nozzle and a conical ring-shaped nozzle assembly mounted rearwardly of the diverging nozzle. The internal surface of the conical ring-shaped nozzle assembly normally lies spread radially outwardly from the conical surface defined by continuing the internal surface of the diverging nozzle rearwardly, or in other words, the conical surface formed by the gases exhausting from the diverging nozzle. Means are only provided responsive to the atmospheric pressure surrounding the nozzle to move the conical ring-shaped nozzle assembly rearwardly so that the internal surface thereof becomes continuous with the internal surface of the diverging nozzle whereby the rear opening of the conical ring-shaped nozzle assembly becomes the effective discharge orifice of the diverging nozzle. Since the rear opening of the conical ring-shaped nozzle is larger than that of the diverging nozzle, the nozzle expansion area ratio is increased which will permit optimum performance of the rocket throughout its flight.

Other objects, aspects, and advantages will become apparent from the following description when read in connection with the accompanying drawings wherein;

FIG. 1 is a side view partially in section of one embodiment of an adjustable nozzle;

FIG. 2 is a sectional view taken on line 2—2 of FIG. 1;

FIG. 3 is a partial sectional view taken on line 3—3 of FIG. 1 showing the details of the atmospheric pressure sensing device which controls movement of the adjustable nozzle;

FIG. 4 is a side view partially in section of another embodiment of the adjustable nozzle;

FIG. 8 is a side view partially in section of an additional embodiment of the adjustable nozzle;

FIG. 9 shows a partial sectional view taken on line 9—9 of FIG. 8;

Figure 5:
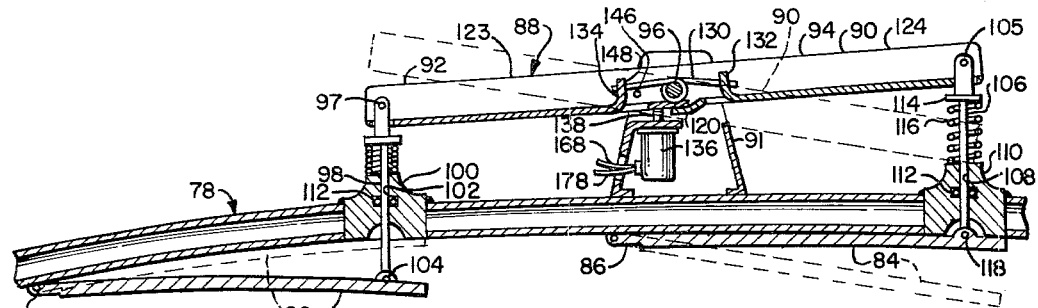
FIG. 5 is an enlarged fragmentary view of FIG. 4 showing details of the device for positioning the flaps on the nozzle.
Figure 6:
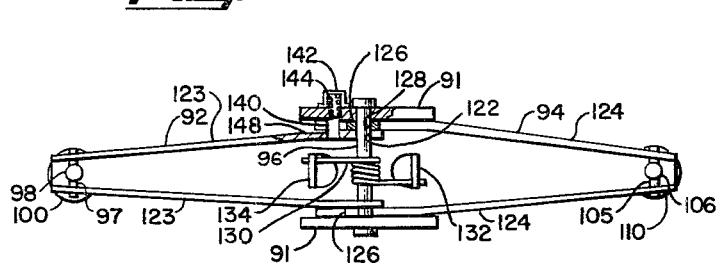
FIG. 6 is a top view, partially in section, of the device shown in FIG. 5.
Figure 7:
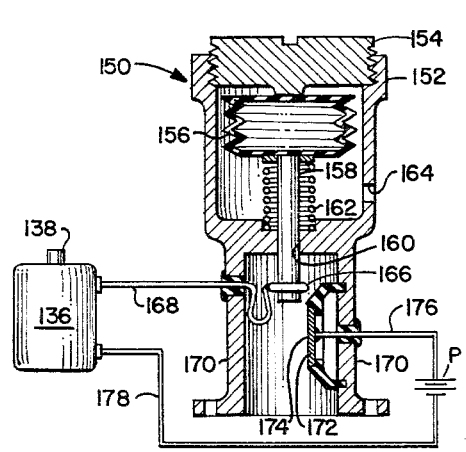
FIG. 7 is a diagrammatic view, partially in section, showing on an enlarged scale the atmospheric pressure sensing device, solenoid, and related electrical circuitry used with the embodiment shown in FIG. 5.

Referring now to FIG. 1 illustrating the first embodiment of the invention, the rear portion of a rocket thrust chamber 10 is shown which has a throat 12 and a nozzle 14. The thrust chamber is of the type comprising a plurality of circumferentially arranged hollow tubes 16 which are shown in cross-section in FIG. 2. These tubes transmit a coolant which may be one of the propellants used in the rocket. This coolant is pumped by means, not shown, throughout the tubes 16 of the nozzle. Some of the tubes designated by numeral 18 extend only partially rearwardly toward the rear of the nozzle 14 and are bent forwardly for permitting coolant to flow to the forward portion of the rocket thrust chamber. These tubes form the fixed portion of the nozzle 14. Others of the tubes designated by numeral 20 extend to the extreme rear of the nozzle 14 and connect with a manifold 22. The tubes 20 are spaced at intermediate points around the circumference of the nozzle 14 to provide spaces indicated by numeral 24. In each of the spaces 24 there is provided a flap 26 which is pivotally mounted to the fixed portion of nozzle 14 by pins 28. The annual series of these flaps constitute a generally conical ring-shaped or hollow nozzle assembly. The interior portions of the flaps 26 are provided with refractory inserts 27 to retain the heat within the nozzle. The flaps 26 are shown in their normal position in FIG. 1 in which the interior surfaces of the flaps lie out of the path of the gases which would be exhausted from the fixed portion of nozzle 14 in a generally conical shape. In order to increase the nozzle expansion area ratio of this rocket nozzle, it is necessary to move the flaps 26 radially inwardly as indicated by the arrow in FIG. 1 so that the inner surfaces of the flaps will become continuous with the inner surface of the fixed portion of nozzle 14.

The means for moving the flaps 26 inwardly, as explained, hereinabove, includes an annular torus 30 mounted on the fixed portion of nozzle 14. On the torus, there are provided a plurality of pedestals 32 each having pivoted thereon a cylinder 34 by pins 35. A piston 36 is slidably mounted in each cylinder 34 and has one end provided with a stop plate 38. A coil spring 40 is mounted between the stop plate 38 and one end of the cylinder 34. The other end of the piston 36 extends outside the cylinder 34 and is pivotally mounted at 42 on a ridge member 44 extending radially outwardly from the upper surface of flap 26. It can be seen that the coil spring 40 acting against stop plate 38 tends to pivot the flap 26 about its pivot pin 28 thereby maintaining the internal surface of the flap out of the path of gases exhausted from the fixed portion of nozzle 14.

In order to actuate the flaps 26, it is necessary to permit fluid to flow through one of the tubes 20 to the torus 30 and to the respective cylinders 34. This is done by providing an outlet conduit 46 extending from the top of one of the tubes 20 on the nozzle 14. This conduit is connected to the torus 30, and the torus has a plurality of smaller conduits 48 connecting it with each of the cylinders 34. In order to control the flow of fluid to each cylinder 34, an atmospheric pressure sensing device, generally indicated by numeral 49, is provided. This device, as best seen in FIG. 3, is imposed in the outlet conduit 46 and includes a housing 50 having a chamber 52 therein and a vent opening 53. A bellows 54 is mounted in the chamber 52 and contains air at sea level pressure. A passage 56 extends through the housing 50 and is connected at each end with the outlet conduit 46. A valve stem member 58 is mounted below the atmospheric pressure sensing device 49 and includes a plate 60 at its upper end. A spring 62 urges the valve stem member 58 normally upwardly. The lower portion of valve stem member 58 is enlarged to close the passage 56 extending through the housing 50. The lower portion of the housing 50 is provided with an upwardly extending cylindrical opening in which the lower portion of valve 58 is slidable. A relatively small stem element 64 connects the plate 60 with the enlarged lower portion of the valve stem member 58. It can be seen that spring 62 normally holds the enlarged lower portion of stem 58 in the passage 56 so as to prevent the flow of any fluid therethrough. When the atmospheric pressure surrounding the pressure sensing device 49 decreases as the rocket ascends, the air in chamber 52 will be vented through vent opening 53. This will permit the air in the bellows 54 to urge the valve stem member 58 downwardly against the force of spring 62, and therefore the enlarged lower portion of valve stem 58 will be pushed out of the passage 56. It can be appreciated that the movement of the valve stem member 58 is gradual in proportion to the changing atmospheric pressure, and when the atmospheric pressure reaches a predetermined low amount, fluid will be permitted to flow through the conduit 46 to the cylinders 34.

It can be seen by this arrangement that the annular series of longitudinally extending flaps 26 on the nozzle 14 will be caused to move radially inwardly in direct proportion to the decreasing atmospheric pressure surrounding the rocket as it ascends into space. As each flaps 26 is pivoted around its pivot pin 28 radially inwardly, that portion of the inner surface of the flap 26 closest its forward end will first come into juxtaposition to the conical path of gases exhausting from the fixed portion of nozzle 14, and that portion of the flap will therefore become the effective discharge orifice for the entire nozzle. Further pivotal movement of each flap 26 in response to the changing atmospheric pressure will cause more rearwardly extending inner portions of the flaps 26 to approach the path of gas exhausting from the fixed portion of nozzle 14 until finally the very end or rearward portion of each of the flaps 26 abuts the manifold 22 which then becomes the effective discharge orifice for the nozzle. It can be appreciated that any number of flaps can be used in this arrangement and that the number shown in FIG. 1 should not be considered an optimum number. It also can be appreciated that the atmospheric pressure sensing device 49 will decrease the flow of fluid to cylinders 34, thereby spreading flaps 26 when the rocket descends from high altitudes.

In FIGS. 4 to 7 of the drawings, there is shown an additional embodiment of the general invention. A rocket thrust chamber 70 is shown similar to that shown in FIGS. 1 and 2 and includes a plurality of hollow tubes 72 which carry a cooling fluid to a rear manifold 74. The tubes 72 are bent so as to form the throat 76 of the thrust chamber and that portion of the tubes extending rearwardly from the throat forms a nozzle 78. An annular series of longitudinally extending flaps 80 are pivotally mounted to the interior surface of the nozzle 78 by finger members 82. A second annular series of flaps 84 is positioned rearwardly of the first series of flaps 80, and the forward end of each of these flaps is also pivotally mounted to the inner surface of the nozzle 78 by fingers 86. The series of flaps 84 constitute a conical ring-shaped or hollow nozzle assembly.

A plurality of positioning devices each generally designated by numeral 88 are circumferentially spaced about the outer surface of nozzle 78 and normally hold the flaps 80 in the position shown in FIG. 4. In this position, the flaps are spaced radially inwardly from the inner surface of nozzle 78 whereby the rear portions of the flaps 80 form the discharge orifice for the passage of gases during initial operation of the thrust chamber at low altitudes. The positioning devices 88 serve to normally hold the flaps 84 in a position adjacent the inner surface of the nozzle 78 as seen in FIG. 4 whereby the flaps lie out of the path of gases exhausted from the rear portion of flaps 80. As most clearly seen in FIGS. 5 and 6 which illustrate one of the positioning devices, the positioning device comprises a longitudinally extending member 90 which is pivotally mounted to a pedestal 91 on the outer surface of the nozzle 78.

The longitudinal member 90 is composed of a front element 92 and a rear element 94 which are pivoted together at 96 on the pedestal 91. The front portion of the front element 92 has pivotally connected thereto by a pin 97 a stem member 98. A boss 100 having an opening 102 therein is mounted on the nozzle 78. The stem member 98 is slidably received in the opening 102 in the boss 100 and has its lower portion pivotally connected by pin 104 to the rear portion of one of the forward flaps 80. Connected to the rear end of element 94 by a pin 105 is a similar stem member 106 slidably mounted in an opening 108 in a boss 110 on the rear portion of the nozzle 78. Sealing rings 112 may be provided which surround the stem members 98 and 106 to prevent gas pressure from escaping from the interior portion of the nozzle 78 to the atmosphere through the openings 102 and 108. The stem member 106 is also provided with a shoulder 114 against which a coil spring 116 abuts and tends to urge the stem 106 and the rear element 94 upwardly, that is, radially outwardly from the surface of the nozzle 78. The lower portion of stem member 106 is mounted by a pivot pin 118 to the rear portion of one of the rear flaps 84.

As seen in FIG. 5, the positioning device 88 is so designed that the front element 92 and the rear element 94 will move together as a single member when pivoting in a clockwise direction, but means are provided for permitting element 92 to remain fixed and element 94 to move or pivot in a counterclockwise direction at the same instant. To permit this, the rear element 94 is provided with a longitudinally extending finger porton 120 which underlies the rear portion of the forward element 92. The front and rear elements 92 and 94 are generally channel shaped. The front element 92 has upstanding sides 123 and the rear element 94 has upstanding sides 124 which terminate in shoulders 126 near the forward end thereof. The pivot pin 96 mounted in the pedestal 91 in a lateral direction passes through openings 122, only one being seen in FIG. 6, which are located just adjacent the rear portion of the upstanding sides 123 of the front element 92. The pivot pin 96 also extends through openings 128, only one being seen in FIG. 6, in the sides 124 of the rear element 94 which openings are located very close to the shoulders 126. A torsion spring 130 surrounds the pivot pin 96 and has each end fixed to tabs 132 and 134 cut out of the bottom portion of the rear and front elements 94 and 92, respectively. The spring 130 tends to pivot the front portion of the front element 92 in a counterclockwise direction and the rear portion of the rear element 94 in a clockwise direction. However, since the finger portion 120 of the rear element 94 underlies the rear portion of the front element 92, the spring 130 merely tends to hold both the elements in a straight position.

A solenoid 136 which is the operating means for the positioning device 88 is mounted in the pedestal 91 and has a plunger element 138 connected to its solenoid core, not shown. This plunger abuts against the lower surface of the rear portion of the forward element 92. It can be seen that upon energization of the solenoid 136 which causes upward movement of the plunger 138, the entire longitudinal member 90 comprising the two elements 92 and 94 is moved in a clockwise direction around the pivot pin 96 to the dotted line position shown in FIG. 5. With member 90 in this dotted line position, it can be seen that the forward series of flaps 80 will be moved to the position shown in dotted lines in FIG. 5, and the flaps 84 will be pivotally moved radially inwardly toward the axis of the nozzle 78. In this position of the flaps 80 and 84, the front flaps 80 no longer are effective to act as the discharge orifice of the nozzle 78 but, instead, the rear portions of the rear flaps 84 become the effective discharge orifice. It can be readily seen that the discharge orifice formed by the rear portions of the flaps 84 is larger than that which was formed by the front flaps 80 in the position shown in solid lines in FIG. 5, and hence, the nozzle expansion area ratio is increased.

In order to retain the flaps 80 against the inner surface of the nozzle 78, it can be appreciated that the front element 92 must remain in the dotted line position shown in FIG. 5. In order to do this, there is provided a latch member 140 which is mounted for lateral movement in the pedestal 91. A small casing 142 on the pedestal 91 surrounds one end of the latch member 140, and a coil spring 144 urges the latch member in the direction of one of the side walls 123 of the front element 92. An opening 146 is provided in the side wall 148 and is positioned below the latch member 140 when the front element 92 is in the solid line position shown in FIG. 5. However, when the front element 92 is moved upwardly or in a clockwise direction by the solenoid 136, the opening 146 will come into registry with the latch member 140, and the spring 144 will push the latch member into the opening therefor, locking the front element 92 in the position shown in dotted lines in FIG. 5.

In order to further increase the nozzle expansion area ratio of this embodiment of the invention, the annular series of rear flaps 84 must also be moved to a position in which they lie against the inner surface of the nozzle 78. This is effected by de-energizing the solenoid 136, thus permitting the coil spring 116 surrounding the stem element 106 to push the stem element and therefore the rear element 94 in a counterclockwise direction back into the position as shown in full lines in FIG. 5. When this is done, the flaps 84 will be lifted against the inner surface of the nozzle 78. At this instant both the front series of flaps 80 and rear series of flaps 84 will be positioned against the inner surface of the nozzle 78 which will permit the very extreme rearward porton of the nozzle 78 to be the effective discharge orifice for exhausting gases through the thrust chamber 70.

In order to operate each solenoid 136 in response to decreasing atmospheric pressures to change the position of the flaps 80 and 84 and obtain an increasing nozzle expansion area, an atmospheric pressure sensing device is provided and is indicated by numeral 150. This device may be mounted anywhere on the thrust chamber and as shown in FIG. 4 is preferably mounted on the nozzle 78. As most clearly shown in FIG. 7, the device 150 incldes a hollow housing 152 closed at its upper end by a cap 154. Within the housing 152, there is a bellows 156 containing air at sea level pressure. Located underneath the bottom of the bellows 156 is a stem 158 which extends through an opening 160 in the lower portion of the housing 152. A spring 162 surrounds the stem 158 and urges it and the bellows in an upward direction. An opening 164 is provided in the side of the housing 152 to provide a vent to the atmosphere. As can be readily seen when the pressure sensitive device 150 is surrounded by atmospheric pressure less than that present in the bellows 156, the bellows will expand causing the air within the housing to be vented through the opening 164. Expansion of the bellows 156 will urge the stem member 158 downwardly. At the lower portion of the stem member, there is a contacting ring 166 which has a conductor 168 which leads to one end of the coil, not shown, of each solenoid 136, only one being illustrated in FIG. 7. The housing 152 has leg portions 170 extending from the bottom thereof for mounting the housing to the nozzle 78 by bolts, rivets, or any other suitable means. Within the space between the legs 170, there is an elongated contacting element 172 having an edge 174 against which the contacting ring 166 on the bottom of stem 158 may ride during expansion of the bellows 156. A power source indicated by "P" is connected by conductor 176 to the contacting element 172. A further conductor 178 connects the other side of the power source "P" to the other end of each solenoid coil.

The operation of the atmospheric pressure sensing device 150 is as follows. When the rocket nozzle 78 ascends into the atmosphere and is thus subjected to a lower atmospheric pressure, the bellows 156 expands and the contacting ring 166 slides against the surface 174 of the contacting element 172 for a certain period of time. This closes the circuit between the power source "P" and the solenoids 136 and thus energizes the solenoids to cause the elongated members 90 to be pivoted around pins 96 to the dotted line position shown in FIG. 5. As explained hereinabove, this causes the flaps 80 to be moved to a position adjacent the internal surface of the nozzle 78 and the flaps 84 are extended radially inwardly to a position in which they constitute the discharge orifice for the thrust chamber. When the atmospheric pressure reaches a predetermined low amount, the contact ring 166 will slide beyond the lower portion of the contacting element 172, thus opening the solenoid circuit. When the circuit is open and the solenoids 136 are de-energized, the rear elements 94 of the positioning means 88 are permitted to return to the position shown in solid lines in FIG. 5 by the coil springs 116. As explained before, the front elements 92 will remain in the dotted line position shown in FIG. 5 because of the operation of the latch members 140. With the two elements 92 and 94 in these positions both series of flaps 80 and 84 will be positioned against the inner surface of the nozzle 78. Consequently, the very rear portion of the nozzle 78 becomes the effective discharge orifice for the thrust chamber, and the nozzle expansion area ratio is at its maximum.

Figure 10:
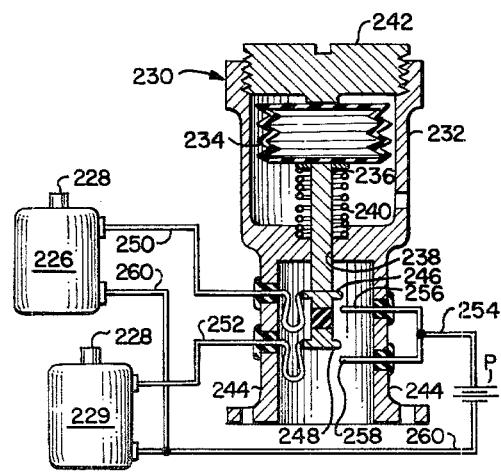
FIG. 10 is a diagrammatic view, partially in section, showing on an enlarged scale the atmospheric pressure sensing device, solenoid, and related electrical circuitry for the embodiments illustrated in FIGS. 8 and 11.

Another embodiment of the invention is shown in FIGS. 8, 9, and 10. In this embodiment, the thrust chamber 190 is also constructed of a plurality of longitudinally extending tubes 192 having a cross-section as seen in FIG. 2 and which carry a coolant. These tubes are also shaped to form a throat 194 and flare outwardly and rearwardly to form a fixed nozzle 196. Instead of using flaps to vary the effective size of the nozzle as in the prior described embodiments of the invention, in this embodiment a plurality of hollow members or generally conical ring-shaped members 198 and 200 are mounted telescopically on the fixed nozzle 196. The conical ring-shaped member 198 has a forward open end with a diameter equal to the diameter of the rear portion of the nozzle 196, and its forward portion is telescopically mounted on the rear portion of the fixed nozzle 196. The second conical ring-shaped member 200 also has a forward open end with a diameter equal to that of the rear portion of the first conical ring-shaped member 198 and is telescopically mounted thereon. The slope of the internal surface of both of the conical ring-shaped members 198 and 200 is substantially the same as the slope of the internal surface of the fixed nozzle portion 196. When the conical ring-shaped members 198 and 200 are positioned in their normal position as shown in solid lines in FIG. 8, the internal surface of these members will lie out of the path of gases exhausted from the fixed nozzle 196. In order to increase the nozzle expansion area ratio, it is merely necessary to move either one or both of the conical ring-shaped members 198 and 200 rearwardly by circumferentially spaced operators 201, to be described hereinbelow, until the respective slopes of their internal surfaces are brought into alignment with the slope of the internal surface of the fixed nozzle portion 196.

The conical ring-shaped member 198 is mounted for slidable movement on the fixed nozzle 196 by a series of track and shoe arrangements. One such arrangement is shown in FIG. 9 and includes a track 202 mounted on the rear portion of the nozzle 196 and extending in a longitudinal direction. Each operator 201 includes a cylinder element 204 having shoe members 206 on legs 208 which extend from the bottom thereof. The shoes 206 are slidably mounted in channels 210 provided in the sides of the track 202. This arrangement permits the entire cylinder element 204 to be moved longitudinally relative to the track 202 and, therefore, relative to the fixed nozzle 196. The rear end of cylinder element 204 is connected to an annular fluid conducting conduit 212 which surrounds the conical ring-shaped member 198 and is fixed to an upstanding shoulder portion 214 thereon. The shoulder 214 is arranged to abut a shoulder 216 on the track element 202 so that the shoulder 216 stops the forward movement of the conical ring-shaped member 198. Mounted on an upstanding flange 218 which is fixed to the track 202 is a hollow piston element 220. This element is connected through a conduit 222 to a manifold 224 to which the tube members 192 are connected and through which fluid is adapted to pass. It can be seen that a fluid may flow through the tubes 192 to the manifold 224 and through conduit 222 and hollow piston element 220 and finally into the right hand portion of the cylinder element 204. It can be appreciated that the fluid will act against the rear side of the annular fluid conducting conduit 212 and will tend to cause the conical ring-shaped member to be extended in a rearward direction.

A latch device in the form of a solenoid 226 is mounted on the cylinder element 204 and includes a plunger 228 connected to the solenoid core, not shown, which normally is received in an opening 231 on the upper portion of the piston element 220. Since the plunger 228 normally sits in the opening 231 it retains and holds the cylinder element 204 from longitudinal movement relative to the hollow piston 220. By merely energizing the solenoid 226 and lifting the plunger element 228, the cylinder element 204 will be permitted to move rearwardly due to the force of fluid acting against the annular fluid conducting conduit 212. Hence, the conical ring-shaped member 198 will also be moved rearwardly so that the internal surface thereof will be continuous with the internal surface of the fixed nozzle element 196, and the orifice of the conical ring-shaped member 198 will become the effective discharge orifice for the thrust chamber 190.

In order to extend the rear conical ring-shaped member 200 to its most rearward position, an additional series of operators 201 exactly the same as the operators used for moving the first conical ring-shaped member 198 is provided. Since the details of the operators have been fully described hereinabove, they will not be repeated. The rearmost series of operators 201 are connected by conduits 225 to the fluid conductive conduit 212 on the conical ring-shaped member 198, and the fluid conducting conduit 212 on conical ring-shaped member 200 has connected thereto fluid return lines 227 which extend forwardly to the pump of the cooling system, not shown, of the rocket thrust chamber, thus completing the flow path of fluid through the cooling system. The cylinder member 204 associated with the second conical ring-shaped member 200 has a solenoid 229 similar to solenoid 226, but which is energized at a later time during ascent of the rocket nozzle into the atmosphere. By an atmospheric pressure sensing device 230, the solenoids 226 and 229 are energized in sequence, thereby causing the first and second conical ring-shaped members 198 and 200 to move rearwardly in sequence, thus increasing the nozzle expansion area ratio in two steps.

The atmospheric pressure sensing device 230 for this device is mounted on the fixed nozzle portion 196 as seen in FIG. 8, the details of the atmospheric pressure sensing device being most clearly seen in FIG. 10. It is seen that this device has essentially the same structure as the atmospheric pressure sensing device 150 used in the second embodiment of this invention shown in FIG. 7. It also includes a hollow housing 232 having a bellows 234 filled with air at sea level pressure. Extending from the lower portion of the bellows 234 is a stem 236 protruding through an opening 238 in the bottom of the housing 232. A spring 240 normally urges the bellows and stem in an upward direction. A cap 242 closes the upper portion of the housing 232. Legs 244 extend from the bottom of the housing for mounting it to the external surface of the nozzle 196. On the lower portion of the stem 236, there is provided a first contracting ring 246 and below that a second contracting ring 248. Ring 246 is connected by a conductor 250 to one end of each solenoid coil, not shown, of solenoids 226. The other ring 248 is connected to each solenoid coil, not shown, of solenoids 229 by a conductor 252. A source of power "P" is provided and is connected by conductor 254 to two contacts 256 and 258 lying in the path of downward movement of the contacting rings 246 and 248. The other side of the power source "P" is connected to the two series of solenoids 226 and 229 by a conductor 260. It can be seen by this arrangement that when the pressure sensing device 230 reaches a predetermined low atmospheric pressure area, the bellows 234 will expand, causing downward movement of the stem 236 and contacting rings 246 and 248. Ring 246 will initially strike the contact member 256 thereby closing the circuit to the solenoids 226. When the pressure sensing device 230 is subjected to an even lower atmospheric pressure, the stem 236 will be further extended to a lower position in which the contracting ring 248 will strike the contact 258 thereby closing the circuit to the solenoids 229. In this position, the contacting ring 246 will be located below the contact 256, thus opening the circuit to the solenoids 226. By this arrangement the sequential movement of the two conical ring-shaped members 198 and 200 is permitted in response to decreasing atmospheric pressure.

Figure 11:
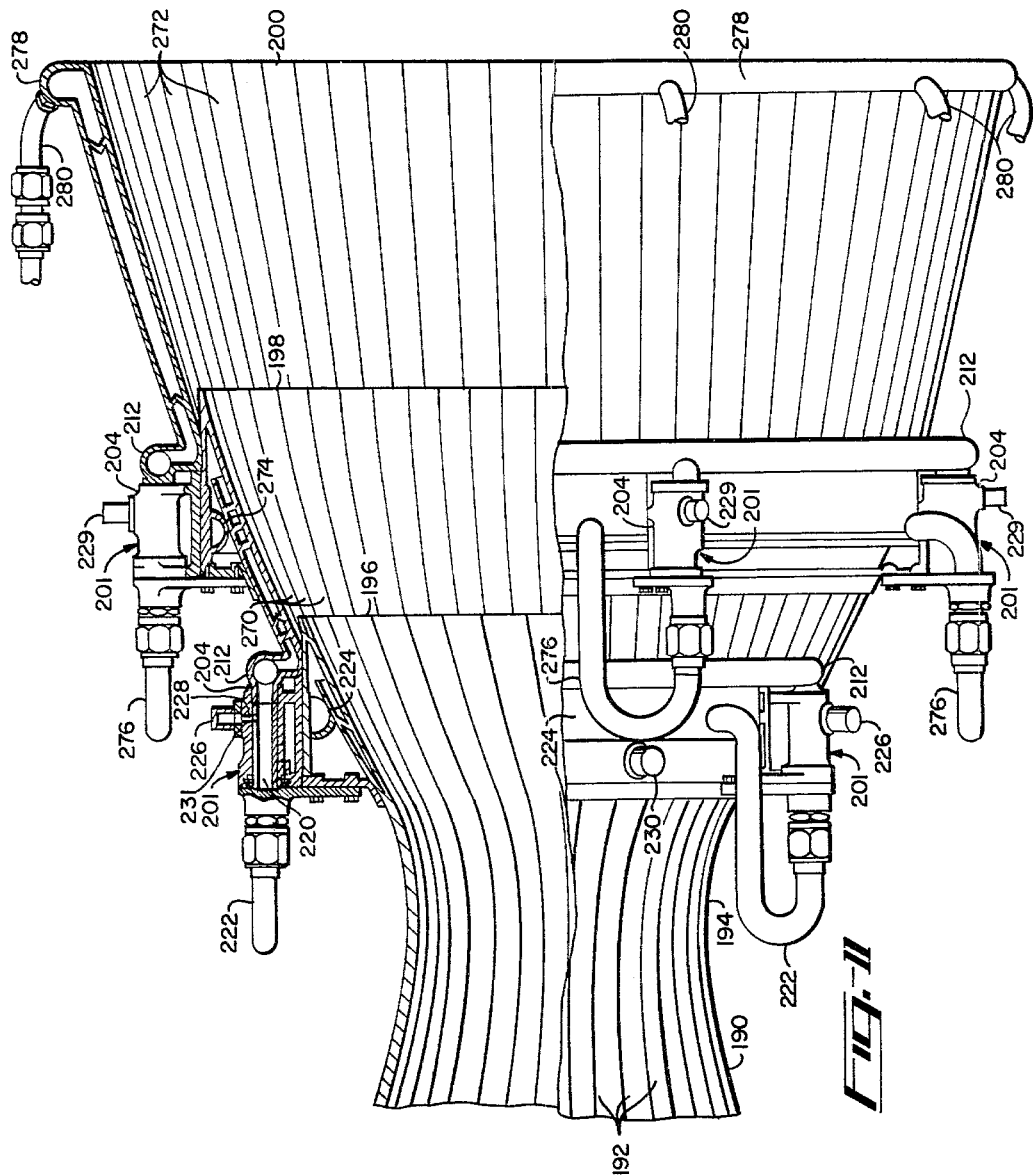
FIG. 11 shows a side view, partially in section, of still another embodiment of the invention.

Another embodiment of the invention very similar to that shown in FIG. 8 is shown in FIG. 11. The same numerals are used in FIG. 11 as used in FIG. 8 and indicate like elements. Only those elements of this embodiment which differ from the embodiment shown in FIG. 8 are indicated by new numerals. In this embodiment, the structure for actuating the conical ring-shaped members 198 and 200 is essentially the same as that shown in FIG. 8. The only difference of structure is that the conical ring-shaped elements 198 and 200 are formed of a plurality of circumferentially arranged tubular members 270 and 272. The tubular members 270 have their front portions connected to the annular fluid conducting conduit 212 on conical ring-shaped member 198 and their rear portions connected to a manifold 274. The manifold 274 is connected to the cylinders 204 on the rear conical ring-shaped member 200 by a conduit 276. This structure permits fluid to flow through the tubes 192 of the thrust chamber to the manifold 224, through conduits 222 to the front piston and cylinder elements, 220 and 204, respectively, and through the annular fluid conducting conduit 212 and the tubes 270 to the manifold 274. Fluid then flows through the rear piston and cylinder elements to the annular fluid conducting conduit 212 on the rear conical ring-shaped member 200, and from there through tubular members 272 to a rear manifold 278. Return lines 280 are connected to the rear manifold 278 for returning the cooling fluid to the low pressure side of a pump in the cooling system, not shown, of the thrust chamber. The atmospheric pressure sensing device 230 for this nozzle arrangement is exactly the same as that shown in FIG. 10.

It can be appreciated that the embodiments of the invention shown in FIGS. 8 and 11 of the drawings have an additional advantage in that the over-all length of the thrust chamber is somewhat shortened because the conical ring-shaped members 198 and 200 are telescopically mounted on the fixed nozzle 196. By merely extending forwardly the track sections 202, an even further shortening of the length of the rocket could be obtained which would greatly facilitate shipping or storing thereof when space is at a premium. It is further appreciated that means could be provided for moving the conical ring-shaped members in a forward direction to decrease the nozzle expansion area ratio when the rocket is descending to a higher atmospheric pressure area.

It will, of course, be understood that various changes can be made in the form, details, arrangements, and proportions of the various parts without departing from the spirit and scope of the invention as defined by the following claims.

We claim:

1. An adjustable nozzle comprising a diverging nozzle having a generally circular discharge orifice for exhausting gases in a conical stream, a generally conical ring-shaped member, the opening at the rear end of said generally conical ring-shaped member providing a second discharge orifice for exhausting gases, the opening at the forward end of said generally conical ring-shaped member having a diameter equal to that of said generally circular discharge orifice of the diverging nozzle, the slope of the internal surface of said generally conical ring-shaped member being substantially the same as the slope of the internal surface of said diverging nozzle, said generally conical ring-shaped member in its normal position having its forward end telescoping the rear portion of said diverging nozzle whereby said internal surface of the generally conical ring-shaped member lies out of the stream of gases exhausted from said diverging nozzle, means slidably mounting said generally conical ring-shaped member on said diverging nozzle for rearward movement to a second position in which said opening at the forward end of said generally conical ring-shaped member is axially aligned with said generally circular discharge orifice of the diverging nozzle, means for moving said generally conical ring-shaped member rearwardly to said second position whereby said internal surface of said generally conical ring-shaped member is continuous with said internal surface of the diverging nozzle; said moving means including a longitudinally extending fluid conducting passage in said diverging nozzle, at least one piston element and one cylinder element, one of said elements being connected to said diverging nozzle and the other of said elements being connected to said generally conical ring-shaped member, said piston element being slidably mounted relative to said cylinder element, said elements extending in a longitudinal direction, and a conduit connecting said fluid conducting passage with said cylinder element whereby fluid supplied to said cylinder element will separate said elements in a longitudinal direction; latch means for holding said piston and cylinder elements relative to each other, and an atmospheric pressure sensitive device for releasing said latch means at a predetermined low atmospheric pressure thereby permitting separation of said elements by fluid supplied thereto.

2. An adjustable nozzle comprising a diverging nozzle having a generally circular discharge orifice for exhausting gases in a conical stream, a generally conical ring-shaped member, the opening at the rear end of said generally conical ring-shaped member providing a second discharge orifice for exhausting gases, the opening at the forward end of said generally conical ring-shaped member having a diameter equal to that of said generally circular discharge orifice of the diverging nozzle, the slope of the internal surface of said generally conical ring-shaped member being substantially the same as the slope of the internal surface of said diverging nozzle, said generally conical ring-shaped member in its normal position having its forward end telescoping the rear portion of said diverging nozzle whereby said internal surface of the generally conical ring-shaped member lies out of the stream of gases exhausted from said diverging nozzle, means slidably mounting said generally conical ring-shaped member on said diverging nozzle for rearward movement to a second position in which said opening at the forward end of said generally conical ring-shaped member is axially aligned with said generally circular discharge orifice of the diverging nozzle, and means for moving said generally conical ring-shaped member rearwardly to said second position whereby said internal surface of said generally conical ring-shaped member is continuous with said internal surface of the diverging nozzle; said moving means including a longitudinally extending fluid conducting passage in said diverging nozzle, at least one piston element and one cylinder element, one of said elements being connected to said diverging nozzle and the other of said elements being connected to said generally conical ring-shaped member, said piston element being slidably mounted relative to said cylinder element, said elements extending in a longitudinal direction, a conduit connecting said fluid conducting passage with said cylinder element whereby fluid supplied to said cylinder element will separate said elements in a longitudinal direction, an annular fluid conducting conduit on said generally conical ring-shaped member, means connecting one end of said cylinder element to said annular fluid conducting conduit, said piston element being hollow and mounted in said cylinder element, and said conduit connecting said fluid conducting passage with said cylinder element being connected at one end to one end of said piston element whereby fluid will flow through said piston element to said cylinder element and said annular fluid conducting conduit.

References Cited by the Examiner

UNITED STATES PATENTS

| | | | |
|---|---|---|---|
| 2,923,127 | 2/1960 | Biehl et al. | 60—35.6 |
| 2,926,491 | 3/1960 | Hyde | 239—455 X |
| 2,927,424 | 3/1960 | Hyde | 60—35.6 |
| 3,032,974 | 5/1962 | Meyer | 60—35.6 |
| 3,098,352 | 7/1963 | Taub et al. | 60—35.6 |
| 3,109,284 | 11/1963 | Ashwood | 60—35.6 |

FOREIGN PATENTS 895,331    5/1962    Great Britain.

BENJAMIN A. BORCHELT, *Primary Examiner.*

SAMUEL FEINBERG, *Examiner.*